Figure 1:
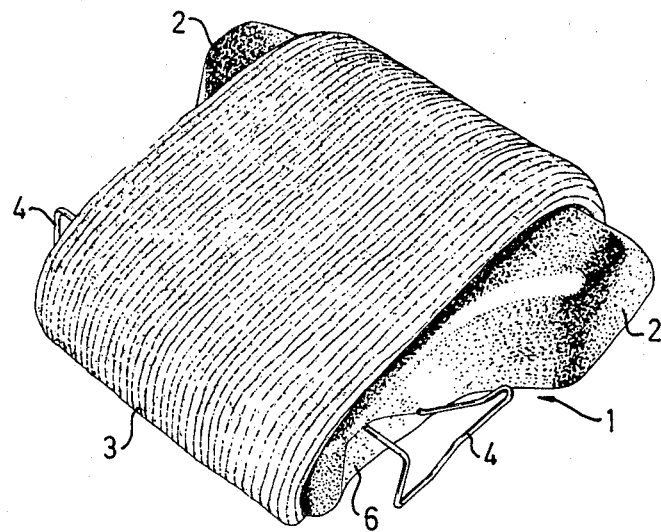

United States Patent [19]

Jonasson et al.

[11] 4,231,613
[45] Nov. 4, 1980

[54] CHILD'S SEAT CUSHION FOR MOTOR VEHICLES

[75] Inventors: Kjell O. Jonasson; Sven Å. Andersson, both of Gothenburg, Sweden

[73] Assignee: AB Volvo, Gothenburg, Sweden

[21] Appl. No.: 33,491

[22] Filed: Apr. 26, 1979

[30] Foreign Application Priority Data

May 2, 1978 [SE] Sweden .............................. 7805018

[51] Int. Cl.³ .............................................. A47D 1/10
[52] U.S. Cl. ..................................................... 297/250
[58] Field of Search ............... 297/250, 253, 254, 488, 297/487, 486, 483

[56] References Cited

U.S. PATENT DOCUMENTS

| | | | |
|---|---|---|---|
| 3,136,579 | 6/1964 | Hunter | 297/250 |
| 3,547,489 | 12/1970 | Grieser | 297/250 |
| 3,606,453 | 9/1971 | Cicero | 297/254 |
| 3,707,008 | 12/1972 | Fellin et al. | 297/250 |
| 3,957,303 | 5/1976 | Mauron | 297/250 |

*Primary Examiner*—Francis K. Zugel
*Attorney, Agent, or Firm*—Young & Thompson

[57] ABSTRACT

A seat cushion for children, placed on the seat bottom of a vehicle seat to provide an elevated sitting position. Uniformly constructed guides for a hip belt, arranged on two opposite sides of the cushion, engage the belt to prevent it from sliding upwards when the cushion is positioned for use and the belt is coupled. Each guide includes a first portion extending forwards in the direction of the vehicle and defining a forwardly opening slot through which one part of the hip belt passes, and a second portion extending laterally outside the slot and forming a stop for a part of the belt located outside the slot to prevent the second part from moving upwards.

6 Claims, 5 Drawing Figures

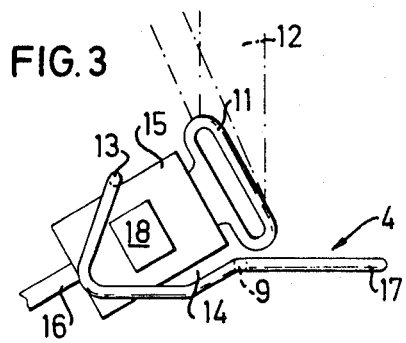
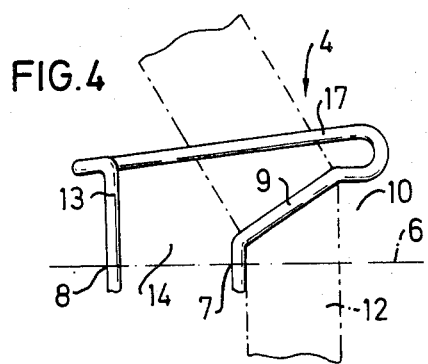
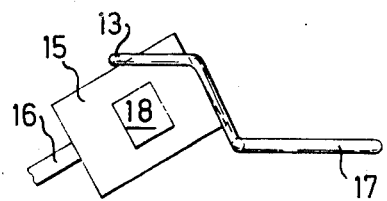

CHILD'S SEAT CUSHION FOR MOTOR VEHICLES

The present invention relates to a seat cushion for children, intended to be placed on the seat bottom of a vehicle seat to provide the child with an elevated sitting position, said cushion being provided on two opposite sides with uniformly constructed guides for a hip belt, said guides being designed to engage the belt in order to limit the possibility, when the cushion is placed in the position for use on the seat bottom of the vehicle seat and the belt is coupled, of the belt sliding upwards, each guide including a first portion extending forward in the direction of the vehicle, which defines a forwardly opening slot, through which one part of the hip belt is intended to pass.

When a child is sufficiently tall (from about 110 cm and up) and mature (normally from 6 years old) to be able to use safety belts intended for adults in modern cars, the fastening points are placed so that the belt will lie incorrectly against the child's body due to the sitting height of the child. Only when the child has reached the age of 12 has it normally reached the height (approximately 150 cm) required so that belts designed for adults can be used without changing the fastening points. There is thus a period of a number of years between the age at which the child can sit in a conventional child's chair placed on the seat and usually facing away from the direction of motion, and the age at which the child can use the existing belts.

To make it possible for the child to use existing belts during said period, it is known to raise the child with the aid of a seat cushion of the type described in the introduction. The guides guide the hip belt so that the belt is prevented from sliding up on the child's stomach and causing internal injuries in a collision or sudden stop.

In a known design, each guide consists of a pair of brackets placed one on top of the other, which are arranged so that a lower, forwardly opening slot and an upper, backwardly opening slot are formed, through which the hip belt runs. The width of the slots is only insignificantly greater than the width of the belts. Such a construction is intended for a hip belt whose locking means is placed approximately in the middle and cannot be used together with modern three-point belts in which the hip belt and the chest belt are made as a continuous band. In such belts, the lock mechanism is fixed on a short strap, so that the lock ends up on one side in the area of one of the guides, which must therefore be constructed in another manner than the opposite guide.

The purpose of the present invention is generally to achieve a seat cushion of the type described in the introduction, which avoids the above disadvantage and is expecially adapted to a three-point belt. Thus the purpose is especially to achieve a cushion which has simply constructed guides for guiding either the part of the belt provided with the lock or the part of the belt with the lock tongue to make it possible for the same cushion to be used on either the right or left side of the back seat.

This is achieved according to the invention by each guide having a second portion extending laterally outside the slot, said second portion being arranged to form a stop for a part of the belt located outside the slot, to restrict the possiblity for the second part to move upwards.

With this construction, either guide can hold a belt part provided with a lock outside the slot without risk of the lock sliding up, thus preventing the child from sliding under the belt. The guide can be constructed so that the lock is easily accessible and so that the stop does not act as an obstacle when the belt parts are to be coupled together or uncoupled after a collision or sudden stop.

Figure 2:
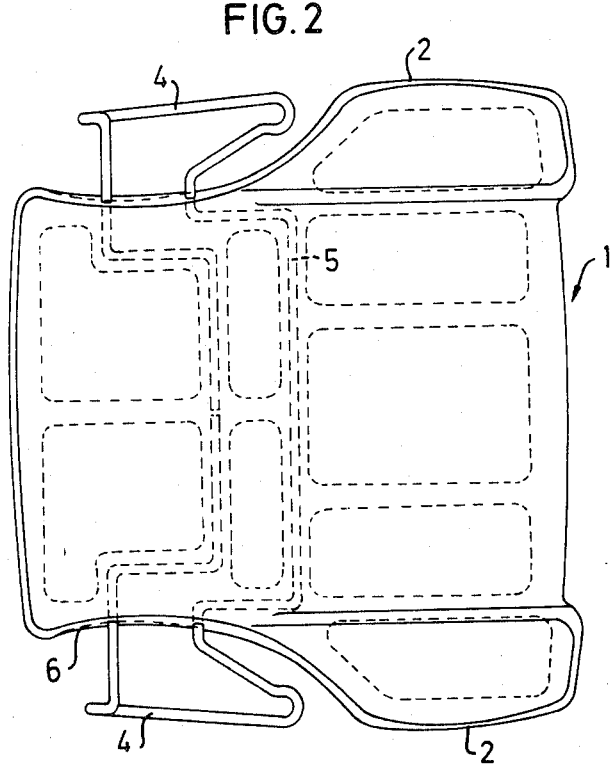

The invention will be described in more detail with reference to the accompanying drawings showing examples, in which FIG. 1 is a perspective view of a cushion according to the invention, FIG. 2 a view from above of the cushion, FIG. 3 a side view of a guide, FIG. 4 a view from above of a guide, and FIG. 5 a side view of the guide in a modified embodiment.

The cushion in FIG. 1 has a frame 1 of plastics material, for example, and is shaped to provide a correct and very comfortable sitting position. The front portion is constructed with a pair of elevated side portions 2 to provide lateral support. On the top side of the frame 1 between the supporting parts 2, there is a "pillow" 3 which extends from the front edge to the rear edge of the frame 1 and is fixed to the underside of the frame in a manner not shown in more detail here.

On either side of the frame behind the support portions 2 there is a guide, generally designated 4, which is securely anchored in the frame 1. The two guides 4 are symmetric with regard to the frame and are, as is evident from FIG. 2, formed of a metal wire loop 5, which is cast in the plastic material of the frame. The cast-in portion of the loop is given such a form between the cavities of the frame that a secure anchoring in the frame is achieved.

FIG. 3 shows the right-hand guide 4 in FIG. 1 as viewed from the side, while FIG. 4 shows the left-hand guide 4 viewed from above. The wire loop 5 sticks out from the side 6 of the frame at a forward point 7 and a rear point 8. From point 7 a first leg 9 extends obliquely forward, which together with the side 6 of the frame 1 defines a forwardly opening slot 10, which is intended to take one part of the hip belt, or, more precisely, the part 12 joined to a chest belt and locking tongue 11, as shown in FIGS. 3 and 4.

The rear point 8 is spaced from the point 7 and is located at a higher level then point 7 (see FIG. 3). From point 8 a second leg 13 extends to the side, forming an upper stop for a lock situated in the space 14 between the legs 9 and 13 on the second belt part 16, which consists of a short, relatively stiff strap.

Between the two legs 9 and 13, there is a third leg 17 which, in addition to increasing the bending strength of the guide, forms an outer boundary of the space 14 and assures that the lock 15 cannot slide to the side away from the stop formed by the leg 13, if the hip belt should not have been sufficiently tightened. In order that the leg 17 will not block the lock's release button 18, the leg is bent so that in the embodiment shown in FIGS. 1–4, it extends below and up behind the release button 18.

In an alternative embodiment which is shown in FIG. 5, the leg 17 first extends up and in front of the release button 18 and then back to the leg 13. This embodiment has the advantage over that described previously that it allows the cushion to slide forward a bit in a collision without risking having the release button blocked.

Thus the invention achieves a seat cushion for children with a simple, inexpensive and effective guide, which can be used for either the part of the belt with the lock or the part with the lock tongue and which, without making the application and removal of the belt more difficult, effectively prevents the hip band from being pulled up on the child's stomach by the chest band when the chest band is pulled in a collision.

What we claim is:

1. In a cushion for children, to be placed on the seat bottom of a vehicle seat to provide the child with an elevated sitting position, said cushion having on two opposite sides uniformly constructed guides (4) for a regular hip belt arranged in the vehicle, said belt comprising a first part (12) and a second part (16) with a locking mechanism (15) for coupling together the two belt parts, said guides being each engageable with an individual belt part in order to, when the cushion is placed in the position for use on the seat bottom and the belt parts are coupled together, hold the cushion in place on the seat bottom and prevent the belt from sliding up on the body of the passenger, each guide comprising a forwardly extending first portion (9), which defines a forwardly open slot (10), through which the first part of the belt is adapted to pass; the improvement in which each guide (4) has a second portion (13), spaced from the first portion (9) and extending laterally from the cushion to form a stop for the second belt part (16) with the locking mechanism (15), said stop being arranged to prevent upward displacement of the locking mechanism in relation to the cushion.

2. Seat cushion according to claim 1, characterized in that the second portion is located behind and at a distance from the first portion, the second part of the belt being receivable in the space between the first and second portions.

3. Seat cushion according to claim 1, characterized in that each guide has a third portion which connects said first and second portions to each other and forms an outer boundary of the space between the first and second portions.

4. Seat cushion according to claim 3, characterized in that the second portion lies on a level above the first portion, and that the third portion extends from the front end of the first portion to the outer end of the second portion, the third portion first extending straight backwards from the first portion and then bending upwards to the second portion.

5. Seat cushion according to claim 1, characterized in that each guide is made of a bent metal wire, which is fixedly joined to the frame of the cushion.

6. Seat cushion according to claim 5, characterized in that both guides are formed of a bent wire loop, which extends across through the frame and forms a pair of hoops on opposite sides thereof.

* * * * *